(12) United States Patent
A/L Krishnasamy et al.

(10) Patent No.: US 9,323,957 B2
(45) Date of Patent: Apr. 26, 2016

(54) ANTI-TAMPER SYSTEM BASED ON DUAL RANDOM BITS GENERATORS FOR INTEGRATED CIRCUITS

(71) Applicant: Marvell World Trade Ltd., St. Michael (BB)

(72) Inventors: Raj Kumar A/L Krishnasamy, Penang (MY); Chia Chieh Thum, Penang (MY); Moo Kit Lee, Penang (MY)

(73) Assignee: MARVELL WORLD TRADE LTD., St. Michael (BB)

( * ) Notice: Subject to any disclaimer, the term of this patent is extended or adjusted under 35 U.S.C. 154(b) by 85 days.

(21) Appl. No.: 14/187,146

(22) Filed: Feb. 21, 2014

(65) Prior Publication Data
US 2014/0250541 A1 Sep. 4, 2014

Related U.S. Application Data

(60) Provisional application No. 61/771,511, filed on Mar. 1, 2013.

(51) Int. Cl.
| | |
|---|---|
| G06F 21/86 | (2013.01) |
| G09C 1/00 | (2006.01) |
| H04L 9/00 | (2006.01) |
| H05K 1/02 | (2006.01) |

(52) U.S. Cl.
CPC ...... G06F 21/86 (2013.01); G09C 1/00 (2013.01); H04L 9/004 (2013.01); H04L 2209/12 (2013.01); H05K 1/0275 (2013.01)

(58) Field of Classification Search
CPC ........ G06F 21/86; H05K 1/0275; G09C 1/00; H04L 9/004; H04L 2209/12
See application file for complete search history.

(56) References Cited

U.S. PATENT DOCUMENTS

| | | | | |
|---|---|---|---|---|
| 4,807,284 A * | 2/1989 | Kleijne | ................... | G06F 21/86 380/52 |
| 4,905,176 A * | 2/1990 | Schulz | ........................ | 708/252 |
| 5,224,430 A * | 7/1993 | MacPherson | .................... | 109/42 |
| 5,793,318 A * | 8/1998 | Jewett | ............................ | 341/118 |
| 7,005,733 B2 | 2/2006 | Koemmerling et al. | | |
| 7,638,866 B1 * | 12/2009 | Bean | ....................... | H01L 23/57 257/686 |
| 2001/0033012 A1 * | 10/2001 | Kommerling | ........... | G06F 21/86 257/679 |
| 2002/0002683 A1 * | 1/2002 | Benson et al. | ................ | 713/194 |
| 2003/0159036 A1 * | 8/2003 | Walmsley et al. | ............ | 713/168 |
| 2006/0086534 A1 * | 4/2006 | Oggioni et al. | ............... | 174/261 |
| 2007/0038865 A1 * | 2/2007 | Oggioni | .................. | G06F 21/87 713/178 |
| 2008/0028247 A1 * | 1/2008 | Muraoka | ................... | G06F 1/30 713/340 |
| 2008/0180245 A1 * | 7/2008 | Hsu et al. | ....................... | 340/571 |
| 2009/0077669 A1 * | 3/2009 | Buer | .............................. | 726/26 |
| 2011/0090658 A1 * | 4/2011 | Adams | .................. | H01L 23/573 361/765 |
| 2013/0015972 A1 * | 1/2013 | Sasson | .................... | G08B 13/22 340/540 |
| 2013/0055416 A1 * | 2/2013 | Ma et al. | ........................ | 726/34 |
| 2014/0053286 A1 * | 2/2014 | Adams | .................... | G06F 21/86 726/34 |
| 2014/0090093 A1 * | 3/2014 | Rahimi et al. | .................. | 726/34 |

OTHER PUBLICATIONS

International Search Report and Written Opinion for PCT/IB2014/000194, filed Feb. 24, 2014.
M. Joye et al., "Strengthening hardware AES implementations against fault attacks", IET Inf. Secur. Sep. 10, 2007, pp. 106-110, vol. 1 No. 3.

* cited by examiner

*Primary Examiner* — Joseph P Hirl
*Assistant Examiner* — Stephen Gundry (57) ABSTRACT

An apparatus includes a mesh block, a first number generator configured to generate a first number, a second number generator configured to generate a second number, and a comparator block configured to compare the first number with the second number and generate an output signal from the mesh block. The output signal indicates an occurrence of an unauthorized activity on the mesh block.

20 Claims, 9 Drawing Sheets

ANTI-TAMPER SYSTEM BASED ON DUAL RANDOM BITS GENERATORS FOR INTEGRATED CIRCUITS

CROSS-REFERENCE TO RELATED APPLICATION

This present disclosure claims the benefit of U.S. Provisional Application No. 61/771,511, entitled "DUAL PSEUDO-RANDOM BITS GENERATOR-BASED ACTIVE MESH WIRE ANTI-TAMPER SYSTEM FOR INTEGRATED CIRCUITS," filed on Mar. 1, 2013, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An anti-tamper (AT) system aims at providing protection against reverse engineering or altering the function of electronic hardware such as computer processors, integrated circuits (IC), and multi-chip modules. The AT system can be categorized as either a passive or an active AT system. For example, a passive AT system includes conformal coatings and/or arranging mesh wires over critical portions of integrated circuits so that the critical portions are not visible without removing the coatings and/or mesh wires. In a passive AT system using mesh wires, no electric signal is transmitted through the mesh wires. On the other hand, an active AT system takes protective actions when unauthorized activities are detected. In an active AT system including mesh wires, electric signals may be transmitted through the mesh wires for detecting unauthorized activities that trigger protective actions.

SUMMARY

In an embodiment, an apparatus includes a mesh block, a first number generator configured to generate a first number, a second number generator configured to generate a second number, and a comparator block configured to compare the first number with the second number and generate an output signal from the mesh block. The output signal indicates an occurrence of an unauthorized activity on the mesh block.

In an embodiment, a method includes generating first and second numbers using first and second number generators in a mesh block, respectively, and comparing the first number with the second number to generate an output signal from the mesh block. The output signal indicates an occurrence of an unauthorized activity on the mesh block.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
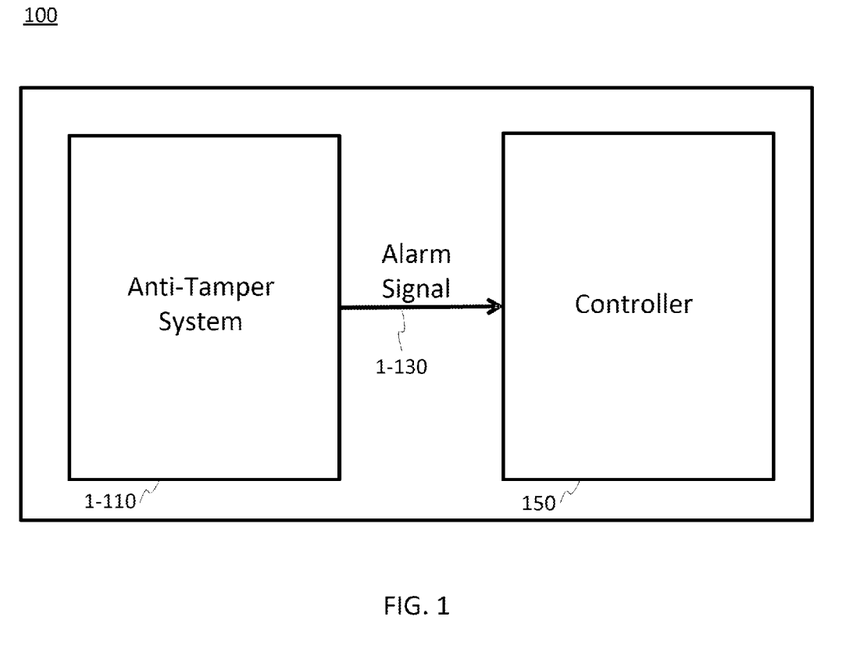
FIG. 1 is a block diagram of a portion of an integrated circuit (IC) including an anti-tamper (AT) system and a controller.

FIG. 1 is a block diagram of a portion 100 of an integrated circuit (IC) including an anti-tamper (AT) system 1-110 and a controller 150. When the AT system 1-110 detects unauthorized activities, the AT system 1-110 provides an alarm signal 1-130 comprising one or more bits to a controller 150 for taking protective actions. For example, these unauthorized activities include one or more of etching a portion of the AT system 1-110, bypassing mesh wires of the AT system 1-110, and disabling clock signals in the AT system 1-110 in order to reverse engineer or alter the functions of the IC.

The controller 150 controls circuit elements of the IC in response to the alarm signal 1-130 for taking the protective actions. The protective actions may include one or more of disabling some of the functions of the IC chip, overwriting or erasing some or all of memory cells in a memory element of the IC chip, or physically damaging or obliterating a critical element of the IC chip.

Figure 2:
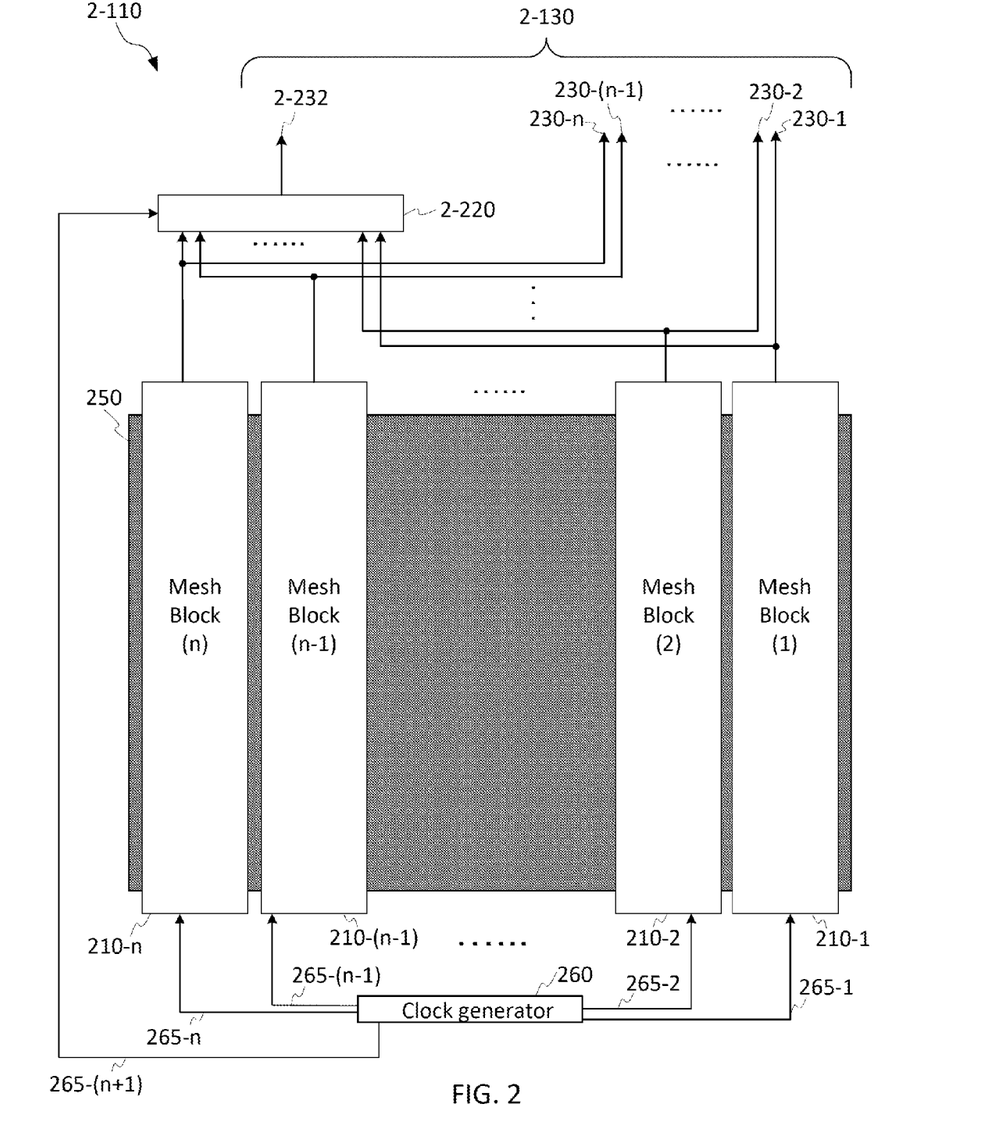
FIG. 2 is a diagram of an AT system according to an embodiment.

FIG. 2 is a diagram of an AT system 2-110 according to an embodiment. The AT system 2-110 includes a plurality of mesh blocks 210-1 to 210-$n$, a clock tampering detector 220, and a clock generator 260.

The plurality of mesh blocks 210-1 to 210-$n$ generates a plurality of block output signals 230-1 to 230-$n$, each of which indicates whether a corresponding mesh block detects unauthorized activities. For example, when a portion of one of the mesh blocks 210-1 to 210-$n$ is etched to expose a critical part of the IC chip underlying the etched portion of the mesh block, the mesh block generates a corresponding block output signal having a first logic value, such as a logic high value (e.g., "1"); otherwise the mesh block generates a second logic value, such as a logic low value (e.g. "0").

The clock generator 260 is coupled to the plurality of mesh blocks 210-1 to 210-$n$ and to a clock tamper detector 2-220. The clock generator 260 provides a clock signal to the plurality of mesh blocks 210-1 to 210-$n$ and the clock tamper detector 2-220 through a plurality of clock wires 265-1 to 265-$(n+1)$. In response to the clock signal, the plurality of mesh blocks 210-1 to 210-$n$ may perform logical operations.

The block output signals 230-1 to 230-$n$ are grouped together with a clock tamper detect signal 2-232 into an (n+1)-bit alarm signal 2-130. The clock tamper detect signal 2-232 is generated by the clock tamper detector 2-220, and takes the logic value of 1 upon reset, and assumes a value equal to the logical-OR of the block output signals 230-1 to 230-$n$ after one clock cycle. As a result, attempting to deactivate one of the active mesh blocks 210-1 to 210-$n$ by cutting off a clock signal will cause the clock tamper detect signal 2-232 of the alarm signal 2-130 to become stuck at logic 1, signaling an alarm.

Figure 3A:
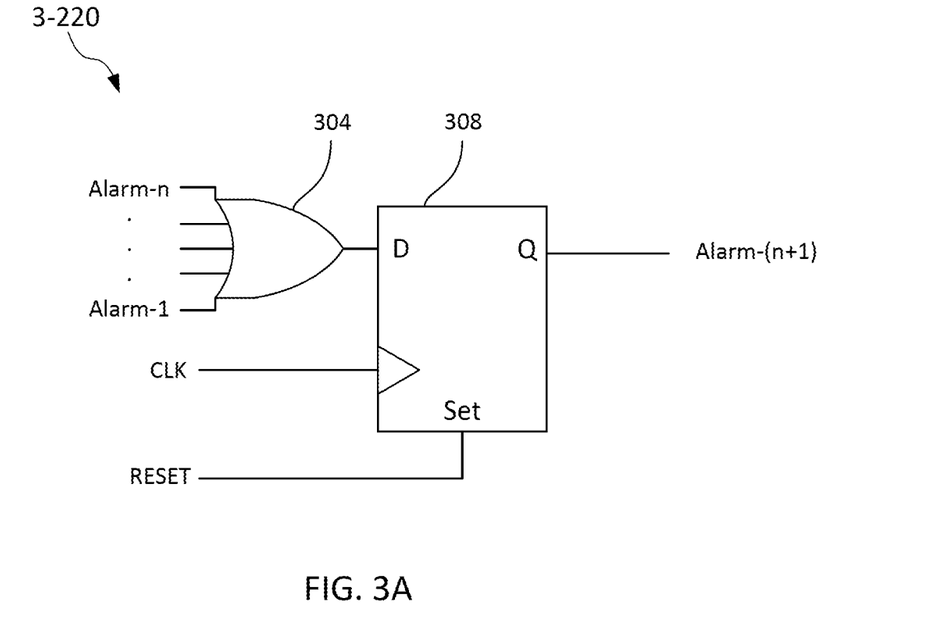
FIG. 3A is a circuit diagram for a clock tamper detector included in the AT system of FIG. 2, according to an embodiment.

FIG. 3A is a circuit diagram of a clock tamper detector 3-220 suitable for use as the clock tamper detector 2-220 of FIG. 2, according to an embodiment. The clock tamper detector 3-220 comprises an n-input OR gate 304 and a latch 308.

Alarm signals Alarm-1 to Alarm-n, corresponding to block output signals 230-1 to 230-$n$ of FIG. 2, are each connected to an input of the n-bit OR gate 304. A clock signal CLK, corresponding to the signal on clock wire 265-($n$+1), is connected to the clock input of the latch 308. A reset signal RESET is connected to a set input of the latch 308. The output of the latch is connected to an Alarm-(n+1) signal, corresponding to the clock tamper detect signal 2-232 of FIG. 2. The operation of the clock tamper detector 3-220 will be explained with reference to FIGS. 3B and 3C.

Figure 3B:
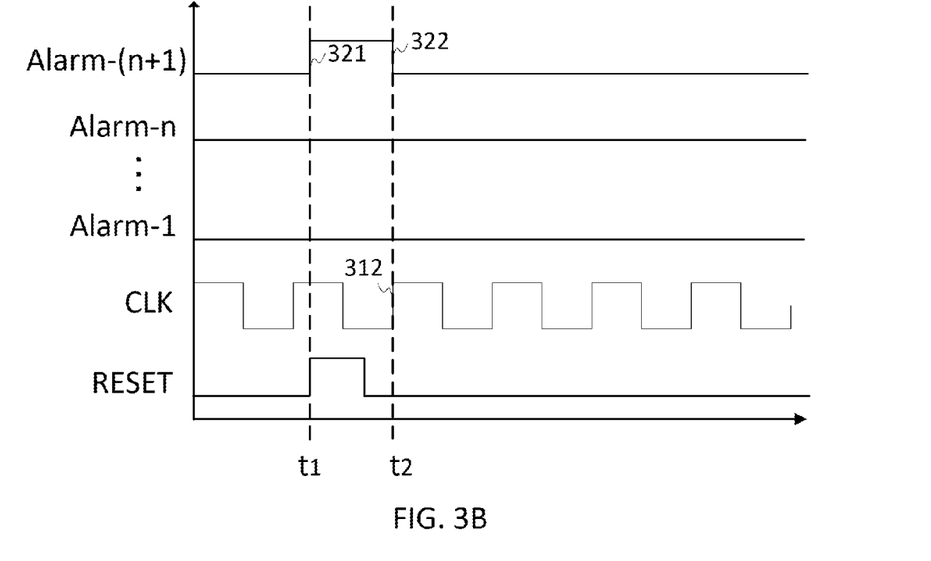
FIGS. 3B and 3C illustrate waveforms related to the operation of the circuit of FIG. 3A.
Figure 3C:
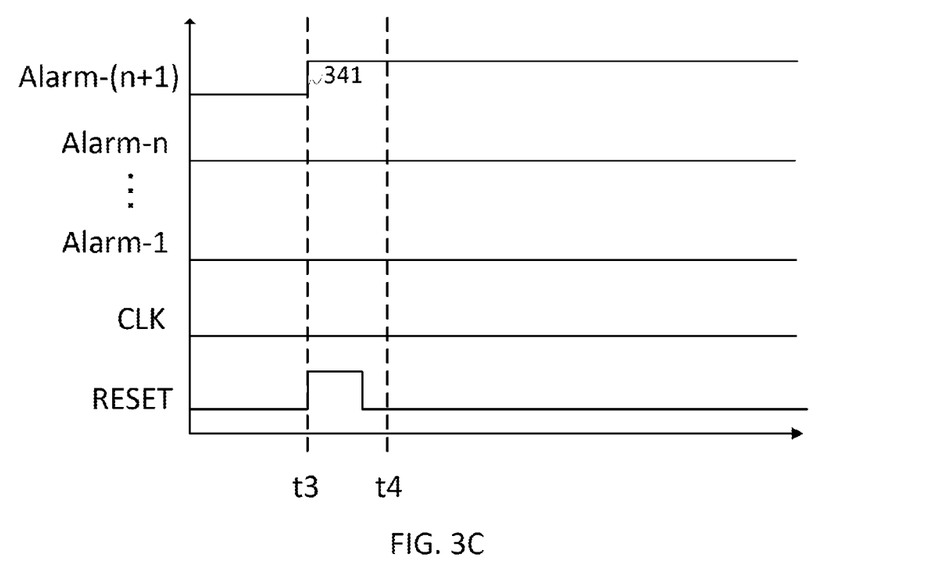

FIGS. 3B and 3C illustrate waveforms associated with the clock tamper detector 3-220 of FIG. 3A. FIGS. 3B and 3C illustrates waveforms of the Alarm-1 through Alarm-n signals, Alarm-(n+1) signals, the reset signal RESET, and the clock signal CLK of FIG. 3A.

FIG. 3B illustrates the operation of the clock tamper detector 3-220 when the clock signal CLK is operating. At a first time t1, the reset signal RESET is asserted, which sets the latch 308 and therefore causes the Alarm-(n+1) signal to have a logic high value (e.g., "1") as illustrated by an edge 321. In an embodiment, the first time t1 corresponds to an edge of another clock signal having a different period from that of the clock signal CLK. When unauthorized activity is not detected by the plurality of mesh blocks 210-1 to 210-$n$ (see FIG. 2), the Alarm-1 through Alarm-n signals have a logic low value (e.g., "0") at the first time t1.

At a second time t2 corresponding to a rising edge 312 of the clock signal CLK subsequent to the first time t1, the latch 308 is clocked and as a result the Alarm-(n+1) signal has a value corresponding to a logical OR of the Alarm-1 through Alarm-n signals. Since the Alarm-1 through Alarm-n signals all have the logic low value at the second time t2, the Alarm-(n+1) is changed to have the logic low value, and accordingly no alarm is signaled.

FIG. 3C illustrates the operation of the clock tamper detector 3-220 when the clock signal CLK has been disabled by unauthorized activities such as cutting off the clock wires 265-1 to 265-($n$+1) of FIG. 2. As a result, the clock tamper detector 3-220 does not produce an output according to the logical OR operation on the Alarm-1 through Alarm-n signals.

Referring to FIG. 3C, at a third time t3 corresponding to the first time t1 of FIG. 3B, the reset signal RESET is asserted to set the latch 308, causing the Alarm-(n+1) signal to have a logic high value (e.g., "1") as illustrated by an edge 341. When unauthorized activity is not detected by the plurality of mesh blocks 210-1 to 210-$n$ (see FIG. 2), the Alarm-1 through Alarm-n signals have a logic low value (e.g., "0") at the third time t3.

At a fourth time t4 corresponding to the second time t2 of FIG. 3B, since the clock signal 310 has been deactivated, the latch 308 is not clocked, and therefore the Alarm-(n+1) signal does not have a value corresponding to the logical OR operation on the Alarm-1 through Alarm-n signals. As a result, the Alarm-(n+1) signal continues to have the logic high value at and after the fourth time t4.

Since at least the Alarm-(n+1) signal, corresponding to the clock tamper detect signal 232 of FIG. 2, continues to have the logic high value, the alarm signal 2-130 of FIG. 2 includes at least one bit having the logic high value and may enable a controller 150 (see FIG. 1) to trigger protective actions. Thus, an attempt to disable the AT system 2-110 by deactivating the clock signal CLK may be frustrated using the Alarm-(n+1) signal.

Figure 4A:
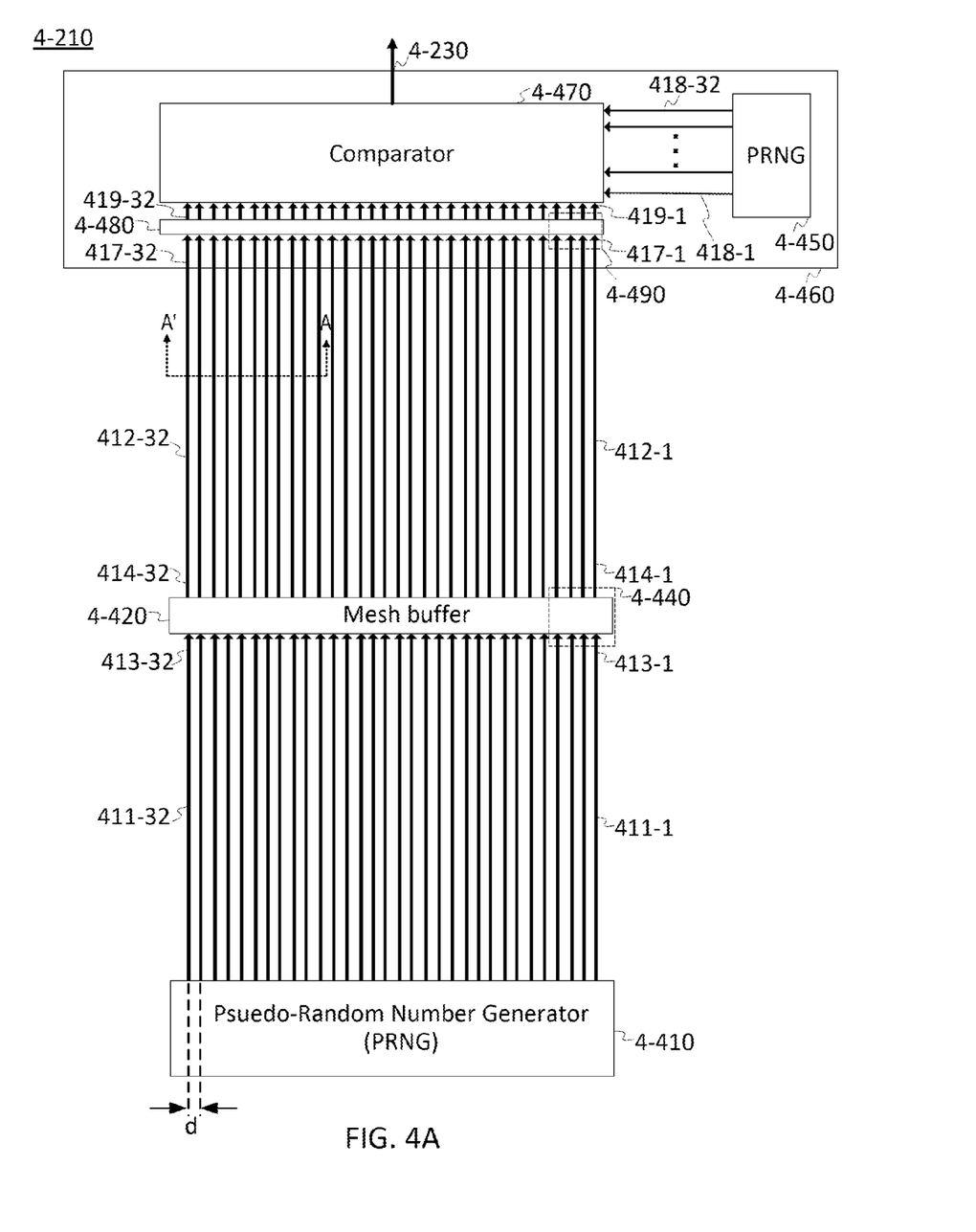
FIG. 4A illustrates a mesh block according to an embodiment.

FIG. 4A illustrates a mesh block 4-210 corresponding to an $i^{th}$ mesh block 210-$i$ shown in FIG. 2 according to an embodiment. The mesh block 4-210 includes a first pseudo-random number generator (PRNG) 4-410, a first plurality of mesh wires 411-1 to 411-32, a mesh buffer 4-420, a second plurality of mesh wires 412-1 to 412-32, and a comparator block 4-460 having a second PRNG 4-450 and a comparator 4-470.

The first PRNG 4-410 is located at or under a portion of the mesh block 4-210 distant from the comparator block 4-460 and generates a first n-bit number X as $X = x_1 x_2 \ldots x_n$. In an embodiment, the first PRNG 4-410 includes a linear feedback shift register (LFSR) that produces pseudo-random numbers using an initial value (or seed) and a feedback function. In an embodiment, the feedback function is implemented using a feedback network comprising a plurality of exclusive-OR (XOR) gates. In another embodiment, the feedback function may be specified using a feedback vector loaded into a feedback vector register, wherein each bit in the feedback vector register enables or disables an XOR gate in the feedback network. The first PRNG 4-410 may include a Fibonacci LFSR or a Galois LFSR.

A plurality of first random signals (or a plurality of first pseudo-random signals) 413-1 to 413-32 indicating the binary numbers $x_1 x_2 \ldots x_{32}$ of the first 32-bit number $x_2$ is transmitted in parallel through the first plurality of mesh wires 411-1 to 411-32, respectively. For example, a first signal 413-1 indicating the first binary number $x_1$ is transmitted through a first mesh wire 411-1, a second signal 413-2 indicating the second binary number $x_2$ is transmitted through a second mesh wire 411-2, and so on.

The first plurality of mesh wires 411-1 to 411-32 connect the first PRNG 4-410 to the mesh buffer 4-420. In an embodiment, neighboring mesh wires of the first plurality of mesh wires 411-1 to 411-32 are spaced narrowly such that unauthorized activities (e.g., etching or bypassing the mesh wires 411-1 to 411-32) to reverse engineer a critical portion of an IC chip underlying the mesh wires 411-1 to 411-32 become difficult. For example, two neighboring mesh wires may be spaced apart by a distance d that is about 0.4 μm.

The mesh buffer 4-420 receives the plurality of first random signals 413-1 to 413-32 corresponding to the binary numbers $x_1 x_2 \ldots x_{32}$ through the first plurality of mesh wires 411-1 to 411-32 and outputs a plurality of modified signals 414-1 to 414-32 corresponding to modified binary numbers $x'_1 x'_2 \ldots x'_{32}$ through the second plurality of mesh wires 412-1 to 412-32. In an embodiment, the mesh buffer 4-420 inverts and amplifies the received random signals 413-1 to 413-32, and also jumbles the signal paths of the received random signals 413-1 to 413-32, as will be explained below in more detail with reference to FIG. 4B. As used herein, the term "jumble" refers to connecting a signal path to one of a plurality of signal paths available between two junctions. For example, a signal is received by the mesh buffer 4-420 through one of the first plurality of mesh wires 411-1 to 411-32 (e.g., first mesh wire 411-$x$) is transmitted to the comparator block 4-460 by connecting the first mesh wire 411-x to one of the second plurality of mesh wires 412-1 to 412-32 by jumbling the signal path at the mesh buffer 4-420.

Figure 4B:
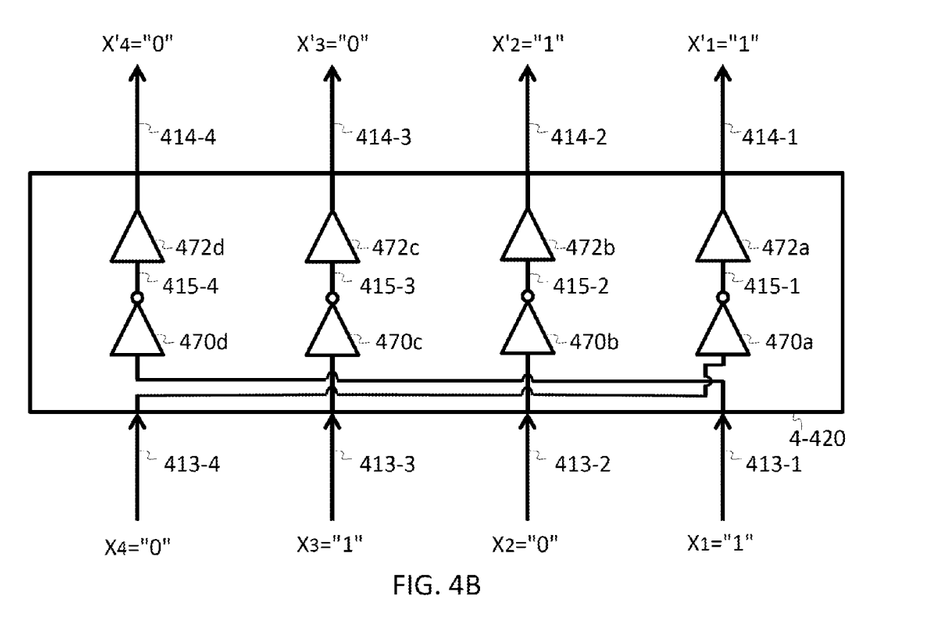
FIG. 4B illustrates a portion of a mesh buffer included in the mesh block of FIG. 4A, according to an embodiment.

FIG. 4B illustrates a portion 4-440 of a mesh buffer 4-420 included in the mesh block 4-210 of FIG. 4A according to an embodiment. The portion 4-440 of the mesh buffer 4-420 includes a plurality of buffers 472a to 472d, which are coupled to a plurality of inverters 470a to 470d in series as shown in FIG. 4B.

In this embodiment shown in FIG. 4B, random signals 413-1 to 413-4 indicating the binary numbers $x_1$ to $x_4$, respectively, are input to the portion 4-440 of the mesh buffer 4-420. For example, a fourth inverter 470d receives a first random signal 413-1 indicating the first binary number $x_1$ that corresponds to a logic high value (e.g., "1") and outputs a fourth inverted signal 415-4 indicating a logic low value (e.g., "0"). Subsequently, a fourth buffer 472d amplifies the fourth inverted signal 415-4 to generate a fourth modified signal 414-4. As a result, the fourth modified signal 414-4 indicates an inverted value of the first random signal 413-1 and has a signal strength higher than that of the first random signal 413-1.

A second random signal 413-2 indicating the second binary number $x_2$ that corresponds to the logic low value (e.g., "0") is input to a second inverter 470b to generate a second inverted signal 415-2 indicating the logic high value (e.g., "1"). Subsequently, the second inverted signal 415-2 is amplified by a second buffer 472b to output a second modified signal 414-2. As a result, the second modified signal 414-2 indicates an inverted value of the second random signal 413-2 and has a signal strength higher than that of the second random signal 413-2.

A third random signal 413-3 indicating the third binary number $x_3$ that corresponds to the logic high value (e.g., "1") is input to a third inverter 470c to generate a third inverted signal 415-3 indicating the logic low value (e.g., "0"). Subsequently, the third inverted signal 415-3 is amplified by a third buffer 472c to output a third modified signal 414-3. As a result, the third modified signal 414-3 indicates an inverted value of the third random signal 413-3 and has a signal strength higher than that of the third random signal 413-3.

A fourth random signal 413-4 indicating the fourth binary number $x_4$ that corresponds to the logic low value (e.g., "0") is input to a first inverter 470a to generate a first inverted signal 415-1 indicating the logic high value (e.g., "1"). Subsequently, the first inverted signal 415-1 is amplified by a first buffer 472a to output a first modified signal 414-1. As a result, the first modified signal 414-1 indicates an inverted value of the fourth random signal 413-4 and has a signal strength higher than that of the fourth random signal 413-4.

In the manner described above, the portion of the mesh buffer 4-420 may invert, amplify, and jumble the random signals 413-1 to 413-4 to generate the modified signals 414-1 to 414-4. As a result, the first modified signal 414-1, second modified signal 414-2, third modified signal 414-3, and fourth modified signal 414-4 are inverted and amplified signals corresponding to the fourth random signal 413-4, second random signal 413-2, third random signal 413-3, and first random signal 413-1, respectively.

A person of skill in the art in light of the disclosure and teachings herein would understand that the random signals 413-1 to 413-4 may be inverted, amplified, and jumbled to generate the modified signals 414-1 to 414-4 using various configurations of the inverters 470a to 470d and buffers 472a to 472d. A person of skill in the art in light of the disclosure and teachings herein would understand that the combined functionality of each combination of an inverter of the inverters 470a-d and a buffer of the buffers 472a-b could be instead provided using an inverting buffer.

Referring back to FIG. 4A, the mesh buffer 4-420 may invert and jumble the plurality of first random signals 413-1 to 413-32 to produce the plurality of modified signals 414-1 to 414-32. As a result, an attempt to bypass the first and second plurality mesh wires 411-1 to 411-32 and 412-1 to 412-32 by connecting the first PRNG 4-410 to the comparator 4-470 would result in signal mismatch between the bypassed signals and the second plurality of signals 418-1 to 418-32, thereby generating a block output signal 4-230 that indicates an occurrence of the bypass attempt.

In addition, the mesh buffer 4-420 may amplify the plurality of first random signals 413-1 to 413-32 to compensate for a transmission loss of the signals 413-1 to 413-32 corresponding to binary numbers $x_1 \, x_2 \ldots x_{32}$ of the first 32-bit number X through the first and second plurality of mesh wires 411-1 to 411-32 and 412-1 to 412-32, and the comparator block wires 417-1 to 417-32.

In an embodiment, the plurality of modified signals 414-1 to 414-32 are input to the inverting block 4-480 included in the comparator block 4-460 through the second plurality of mesh wires 412-1 to 412-32 and the comparator block wires 417-1 to 417-32. The comparator block wires 417-1 to 417-32 may be disposed in a different layer from the second plurality of mesh wires 412-1 to 412-32. For example, when the second plurality of mesh wires 412-1 to 412-32 are disposed in an upper interconnect layer, the comparator block wires 417-1 to 417-32 may be disposed in one or more lower interconnect layers located beneath the upper interconnect layer, as will be described in relation to FIG. 5.

The inverting block 4-480 inverts the plurality of modified signals 414-1 to 414-32 again to output a first plurality of input signals 419-1 to 419-32. In an embodiment, the inverting block 4-480 also jumbles the received signals 414-1 to 414-32 so that the first plurality of input signals 419-1 to 419-32 has a logic value corresponding to the plurality of first random signals 413-1 to 413-32, respectively, as will be explained below with reference to FIG. 4C.

Figure 4C:
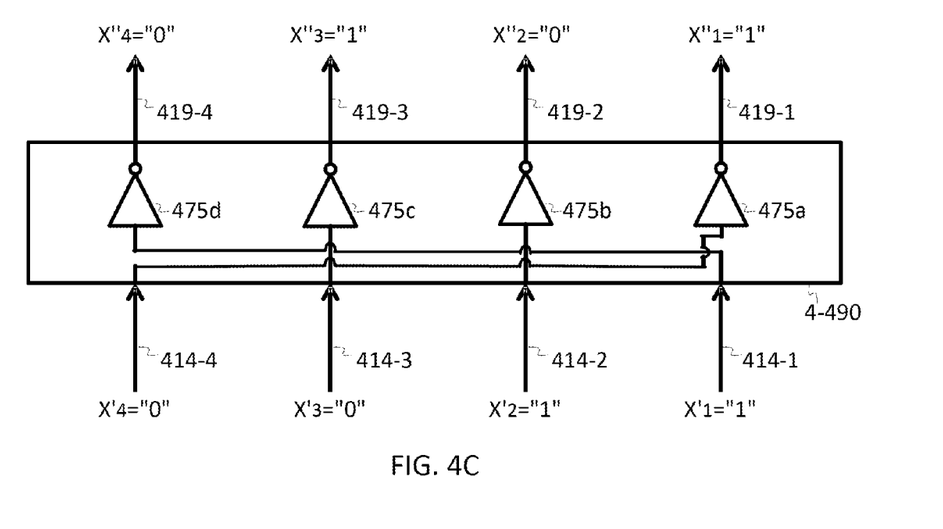
FIG. 4C illustrates a portion of an inverting block included in the mesh block of FIG. 4A, according to an embodiment.

FIG. 4C illustrates a portion 4-490 of an inverting block 4-480 included in the mesh block of FIG. 4A, according to an embodiment. The fourth modified signal 414-4 indicating the inverted binary number $x'_4$ that corresponds to the logic low value (e.g., "0") is inverted to a first input signal 419-1 by a fourth inverter 475d of the inverting block 4-480. The first input signal 419-1 indicates the binary number $x_1"$ that corresponds to the high logic value (e.g., "1"). As a result, the first input signal 419-1 has a logic value $x"_1$ this is the same as the logic value $x_1$ of the first random signal 413-1. Similarly, a fourth input signal 419-4 has a logic value $x"_4$ (e.g., "0") corresponding to the logic value $x_4$ (e.g., "0") of the fourth random signal 413-4.

The second modified signal 414-2 indicating the inverted binary number $x'_2$ that corresponds to the logic high value (e.g., "1") is inverted to a second input signal 419-2 indicating the binary number $x_2"$ by a second inverter 475b of the inverting block 4-480. The second input signal 419-2 indicates the binary number $x_2"$ that corresponds to the low logic value (e.g., "0"). As a result, the second input signal 419-2 has a logic value $x"_2$ corresponding to the logic value $x_2$ of the second random signal 413-2. Similarly, a third input signal 419-3 has a logic value $x"_3$ (e.g., "1") corresponding to the logic value $x_3$ (e.g., "1") of the third random signal 413-3.

The portion 4-490 of the inverting block 4-480 inverts and jumbles the modified signals 414-1 to 414-4 to generate the input signals 419-1 to 419-4. As a result, the first input signal 419-1, second input signal 419-2, third input signal 419-3, and fourth input signal 419-4 have the same logic value corresponding to the first random signal 413-1, second random signal 413-2, third random signal 413-3, and fourth random signal 413-4, respectively. A person of skill in the art in light of the disclosure and teachings herein would understand that the modified signals 414-1 to 414-4 may be inverted and jumbled to generate the input signals 419-1 to 419-4 using various configurations of the inverters 475a to 475d and wires connecting the inverters 475a to 475d.

In the manner described above, the inverting block 4-480 inverts and jumbles the plurality of modified signals 414-1 to 414-32 such that output first plurality of input signals 419-1 to 419-32 have the same logic value as the first plurality of random signals 413-1 to 413-32, respectively. As a result, the first plurality of input signals 419-1 to 419-32 corresponding to the binary numbers $(x_1, x_2, \ldots, x_n)$ generated by the first PRNG 4-410 is input to the comparator 4-470.

The second PRNG 4-450 is located in the comparator block 4-460 and generates a second n-bit number Y as $y_1$ $y_2 \ldots y_n$. Since the second PRNG 4-450 is embedded in the comparator block 4-460, an external access to the second PRNG 4-450 for extracting the second n-bit number Y would be difficult. In an embodiment, the comparator block 4-460 is located wholly or in part beneath the second plurality of mesh wires 412-1 through 412-32, further increasing the difficulty of tampering with or observing the operation of the second PRNG 4-450 and the comparator block 4-460.

In an embodiment, the second PRNG 4-450 includes a linear feedback shift register (LFSR) that produces pseudorandom numbers using the same seed and feedback function as the first PRNG 4-410. As a result, the binary numbers $x_1$ $x_2 \ldots x_n$ generated by the first PRNG 4-410 corresponds to the binary numbers $y_1$ $y_2 \ldots y_n$ generated by the second PRNG 4-450, respectively.

In an embodiment, the circuitry used to implement the second PRNG 4-450 substantially duplicates the circuitry used to implement the first PRNG 4-410. In another embodiment, the circuitry used to implement the second PRNG 4-450 differs from the circuitry used to implement the first PRNG 4-410, but produces an identical sequence of pseudorandom numbers when using with the same seed and feedback function as the first PRNG 4-410.

The comparator 4-470 receives the first plurality of input signals 419-1 to 419-32 indicating the binary numbers $(x_1, x_2, \ldots, x_n)$ of the first random number X and the second plurality of input signals 418-1 to 418-32 indicating the binary numbers $(y_1, y_2, \ldots, y_n)$ of the second random number Y in order to generate the block output signal 4-230 indicating if X=Y or X≠Y. In an embodiment, the comparator 4-470 generates the block output signal 4-230 having a logic low value (e.g., "0") if X=Y, and a logic high value (e.g., "1") if X≠Y.

In an embodiment, the comparator 4-470 receives the first plurality of input signals 419-1 to 419-32 indicating the binary numbers $(x_1, x_2, \ldots, x_n)$ and the second plurality of input signals 418-1 to 481-32 indicating the binary numbers $(y_1, y_2, \ldots, y_n)$ in parallel, as shown in FIG. 4A. For example, the comparator 4-470 includes an iterative network (not shown) having an n-number of cells, each of which receives a pair of bits of X and Y. In this iterative network, a first cell (not shown) of the iterative network receives the input signals 419-1 and 418-1 indicating the binary numbers $x_1$ and $y_1$, and the second cell (not shown) receives the input signals 419-2 and 418-2 indicating the binary numbers $x_2$ and $y_2$, and the like.

In another embodiment, the comparator 4-470 receives the first plurality of input signals 419-1 to 419-32 indicating the binary numbers $(x_1, x_2, \ldots, x_n)$ and the second plurality of input signals 418-1 to 481-32 indicating the binary numbers $(y_1, y_2, \ldots, y_n)$ in sequence. For example, the comparator block 4-460 includes a first serializer that receives the first plurality of input signals 419-1 to 419-32 in parallel and outputs a first input signal indicating one of the binary numbers $(x_1, x_2, \ldots, x_n)$ in a sequence. The comparator block 4-460 also includes a second serializer that receives the second plurality of input signals 418-1 to 418-32 in parallel and outputs a second input signal indicating one of the binary numbers $(y_1, y_2, \ldots, y_n)$ in the same sequence as the first serializer. As a result, the first and second serializers output the first and second input signals to a cell of the comparator 4-470 such that the cell receives a pair of corresponding binary numbers $(x_i, y_i)$ substantially at the same time. The comparator 4-470 generates the block output signal 4-230 having a logic low value (e.g., 0) if X=Y and a logic high value (e.g., 1) if X≠Y.

Figure 4D:
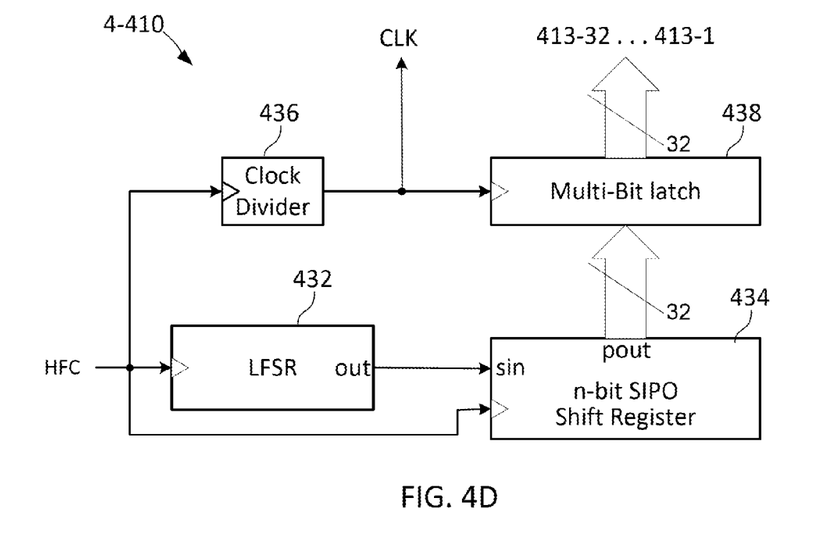
FIG. 4D is a diagram of a first circuit for generating a pseudo-random number included in the mesh block of FIG. 4A, according to an embodiment.

FIG. 4D is a circuit diagram of a first PRNG 4-410 included in the mesh block of FIG. 4A, according to an embodiment. The first PRNG 4-410 includes an LFSR 432, a Serial In, Parallel Out (SIPO) shift register 434, a clock divider 436, and a multi-bit latch 438.

A High-Frequency Clock (HSC) is provided to the LFSR 432. Each cycle of the HFC, the LFSR 432 generates a new output bit on its output ("out") according to the current internal state value and the feedback function of the LFSR 432. The LFSR 432 also generates a new internal state value according to the current internal state value and the feedback function of the LFSR 432.

When the LFSR 432 is initialized, the internal state value of the LFSR 432 is set to a seed value. In an embodiment, each mesh block may have different seed value.

In an embodiment, the seed value is predetermined by the design of the LFSR 432. In an embodiment, the seed value is provided to the LFSR 432 by a controller or processor, the seed value being communicated to the LFSR 432 using a serial bus or a parallel bus. The seed value provided to the LFSR 432 during one initialization may differ from the seed value provided during a previous or subsequent initialization.

The feedback function used by the LFSR 432 may be determined by the design of the circuit. Alternatively, the feedback function may be determined by a feedback vector provided to the LFSR 432 using a serial bus or a parallel bus. For example, the feedback vector may include a control bit for each tap in the LFSR, wherein the tap is used to generate feedback when the respective control bit is in a first logic state, and the tap is not used to generate feedback when the respective control bit is in a second logic state.

Each cycle of the HSC, the shift register 434 receives the output of the LFSR 432 on a serial input ("sin") and shifts the previously received bits down one position, so that after N clock cycles, the N most recent output values of the LFSR 432 are provided on the parallel output ("pout") of the shift register 434.

The clock divider 436 produces a clock CLK by dividing the HSC. Each cycle of the clock CLK, the latch 438 loads in the values on the parallel output pout of the shift register 434. The outputs of the latch 438 provide the first random signals 413-1 through 413-32.

In an embodiment, the clock divider 436 produces the clock CLK by dividing the HSC by a divisor equal to the number of bits in the latch 438. In another embodiment, the clock divider 436 produces the clock CLK by dividing the HSC by a divisor greater than the number of bits in the latch 438. Using a divisor greater than the number of bits in the latch 438 may increase the difficulty of determining, from the first random signals 413-1 through 413-32, the seed value and/or feedback function of the LFSR 432.

Figure 4E:
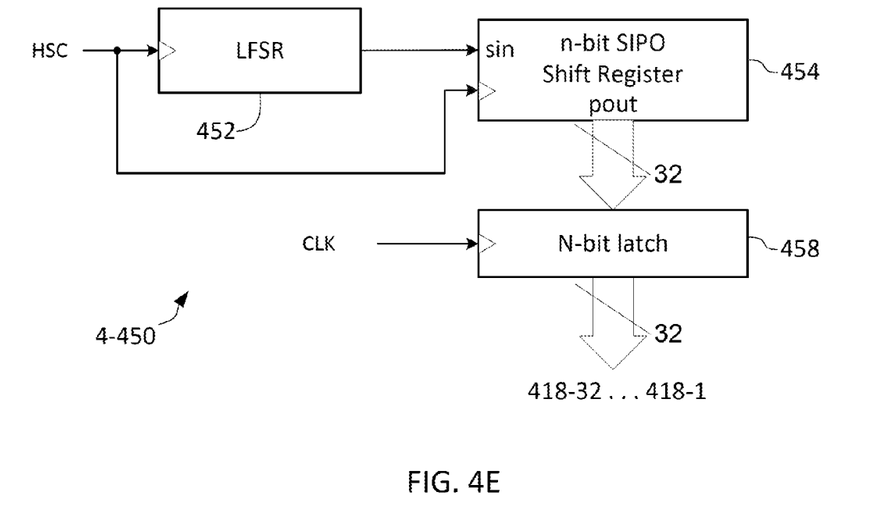
FIG. 4E is a diagram of a second circuit for generating a pseudo-random number included in the mesh block of FIG. 4A, according to an embodiment.

FIG. 4E is a circuit diagram of a second PRNG 4-450 included in the mesh block of FIG. 4A, according to an embodiment. The second PRNG 4-450 includes an LFSR 452, a Serial In, Parallel Out (SIPO) shift register 454, and a multi-bit latch 458.

The second PRNG 4-450 operates in the same fashion, and uses the same seed value, feedback function, high speed clock (HSC), and clock CLK, as the first PRNG 4-410 of FIG. 4D. As a result, the values produced by the second PRNG 4-450 on the second plurality of input signals 418-1 through 418-32 during a cycle of the clock CLK will be identical to the values produced by the first PRNG 4-410 of FIG. 4E on the first plurality of random signals 413-1 through 413-32 during that cycle of the clock CLK.

In an embodiment, the second PRNG 4-450 uses the clock CLK produced by the clock divider 436 of the first PRNG 4-410. In another embodiment, the second PRNG 4-450 generates a version of the clock CLK using a clock divider identical to the clock divider 436 of the first PRNG 4-410. In an embodiment, the clock CLK used by the second PRNG 4-450 is delayed relative to the clock CLK used by the first PRNG 4-410 to accommodate circuit delays in the wire mesh.

Figure 5:
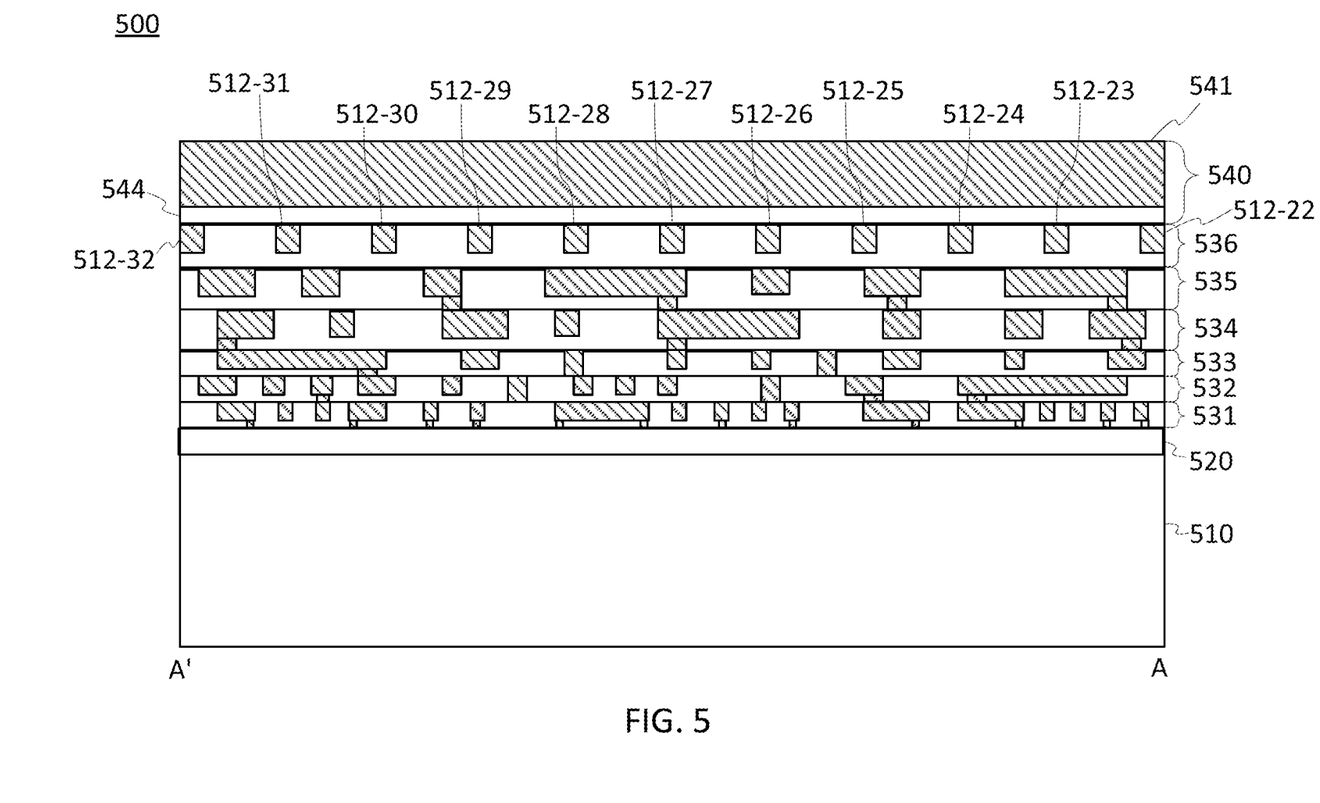
FIG. 5 is a cross-sectional view illustrating a plurality of layers including a portion of the mesh block of FIG. 4A, according to an embodiment.

FIG. 5 is a cross-sectional view 500 illustrating a plurality of layers according to an embodiment. The cross-sectional view 500 illustrates a cross-section along the line A-A' shown in FIG. 4A. The cross-section includes a redistribution layer 540, first through sixth interconnect layers 531 through 536 (often called the metal 1 layer through metal 6 layer, respectively), a device layer 520, and a substrate 510. The first through fifth interconnect layers 531 through 535 are lower interconnect layers, and the sixth interconnect layer 536 is an upper interconnect layer. In an embodiment, additional interconnect layers may be present above, below, or both above and below the first through sixth interconnection layers 531 through 536.

A plurality of mesh wires 512-22 to 512-32 corresponding to the plurality of mesh wires 412-22 to 417-32 (see FIG. 4A) are included in the sixth interconnect layer 536. The mesh wires 512-22 to 512-32 are spaced so as to prevent physical and/or electrical access, such as by probing, to the circuitry underneath the mesh wires 512-22 to 512-32, such as the interconnects in the first through fifth interconnect layers 531 through 535 and/or the electronic devices in the device layer 520. For example, in a 40 nanometer CMOS process, the mesh wires 512-22 to 512-32 may be spaced 40 micrometers apart.

The Re-Distribution Layer (RDL) 540 includes a redistribution metal layer 541 that distributes electric power for operating the circuits of the IC chip. The redistribution metal layer 541 may cover substantially all of a surface of the RDL, and accordingly may prevent visual inspection of the circuitry beneath the RDL 540. The RDL 540 also includes a dielectric layer 544 serving as an insulating layer. In an embodiment, the dielectric layer 544 includes an opaque material that further obscures the underlying circuits. In an embodiment, an opaque cover layer covers the RDL 540.

The device layer 520 includes a plurality of active and passive electronic devices connected together to form circuits, such as logic gates, that perform various operations of the IC chip. The active and passive electronic devices are connected using one or more of interconnecting wires in the first through sixth interconnect layers 531 through 536.

The portion of the device layer 520 located beneath the mesh wires 512-22 to 512-32 includes the devices and circuits being protected from tampering and reverse engineering. In an embodiment, the some or all of the circuitry monitoring the mesh wires 512-22 to 512-32, such as the circuits shown in FIGS. 2 and 4, are located in the portion of the device layer 520 located under the mesh wires 512-22 to 512-32, so that the monitoring circuitry is protected from tampering and reverse engineering.

Each of the first through sixth interconnection layers 531 through 536 includes conductive interconnects separated by a dielectric material. The interconnection layers 531 through 536 may include a plurality of layers in which different types of metal wires are disposed. Furthermore, different types or groups of signals may be routed across the IC chip using different interconnect layers.

For example, the clock wires 265-1 to 265-(n+1) of FIG. 2 may be routed across the chip using portions of the second and third interconnect layers 532 and 533 located beneath mesh wires including mesh wires 512-22 to 512-32. The alarm wires 230-1 to 230-n of FIG. 2 transmitting the (n+1)-bit alarm signals 2-130 of FIG. 2 to the controller 150 of FIG. 1 may be routed across the chip using portions of the second, third, and/or fourth interconnect layers 532 through 534 that are located beneath mesh wires. The comparator block wires 417-1 to 417-32 may be disposed in one or more of the first through fifth interconnection layers 531 through 535, so that the comparator block wires 417-1 to 417-32 are disposed in a layer under a plurality of mesh wires disposed in the sixth interconnect layer 536. Other wires and circuits may be similarly protected. As a result, the anti-tamper system 1-110 of FIG. 1 protects itself against tampering and reverse engineering.

Figure 6:
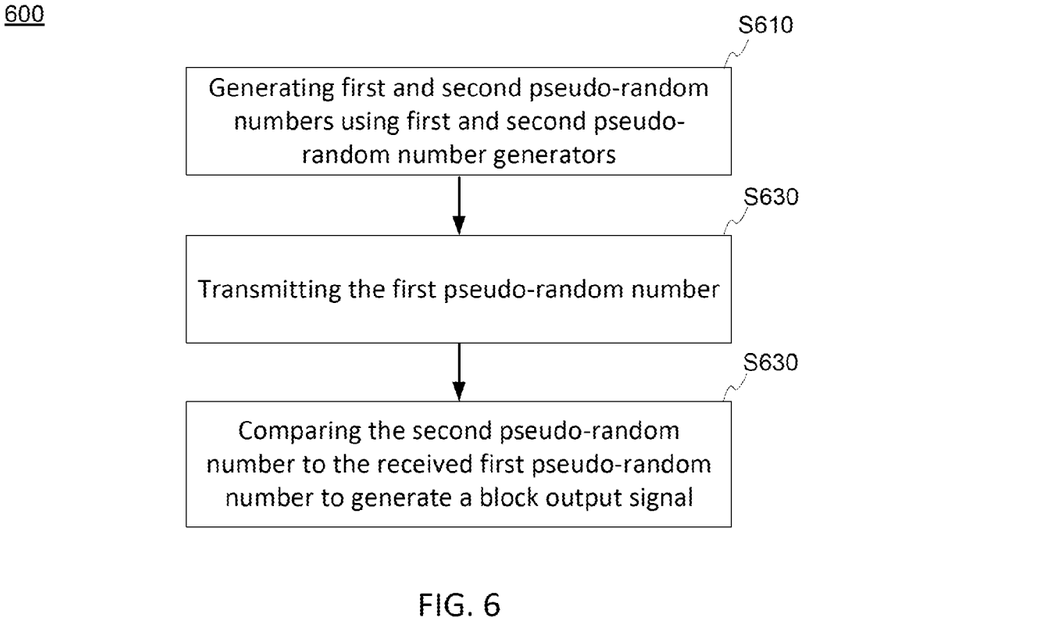
FIG. 6 is a flow chart of a method for generating an alarm signal of an AT system according to an embodiment.

FIG. 6 is a flow chart 600 of a method for generating a block output signal of a mesh block according to an embodiment. The method may be used to detect unauthorized activities on the mesh block, for instance, etching a portion of the mesh block to expose the critical part of an IC chip underlying the etched portion.

At S610, first and second n-bit pseudo-random numbers are generated by first and second pseudo-random number generators (PRNGs). In an embodiment, the second PRNGs is located in a comparator block to make an external access to the second PRNG difficult. The first and second PRNGs generate matching sequences of pseudo-random numbers.

At S620, the first pseudo-random number is transmitted using the mesh block and received by the comparator block.

At S630, the received first pseudo-random number is compared to the second pseudo-random number in the comparator block. The comparator block may generate a block output signal indicating whether the two n-bit numbers are the same or not. In an embodiment, the comparator block generates the block output signal having a logic low value (e.g., "0") when the two n-bit numbers are the same and a logic high value (e.g., "1") and when the two n-bit numbers are different.

Figure 7:
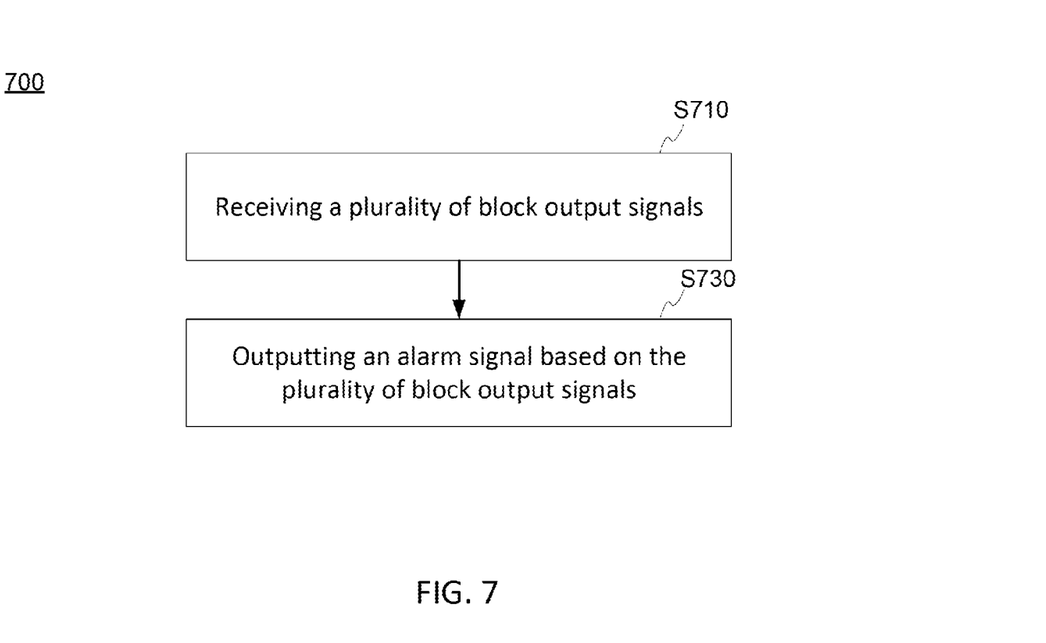
FIG. 7 is a flow chart of a method for generating an alarm signal of an AT system according to an embodiment.

FIG. 7 is a flow chart 700 of a method for generating an alarm signal of an AT system according to an embodiment. The method may be used to detect unauthorized activities on one or more of the mesh blocks included in an IC chip, thereby generating the alarm signal to take protective actions against reverse engineering or altering the functions of the IC chip.

At S710, a plurality of block output signals, each of which has been generated according to the method shown in FIG. 6, is received. In an embodiment, each of the plurality of block output signals has a logic low value (e.g., "0") or a logic high value (e.g., "1").

At S730, an alarm signal based on the received block output signals is output. In an embodiment, when any of the received block output signals has the logic high value (e.g., "1"), the alarm signal triggers protective actions against reverse engineering or altering the functions of the IC chip.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method comprising:
    generating first and second pseudo-random numbers using first and second pseudo-random number generators (PRNGs) in an electronic mesh block, respectively;
    transmitting a first plurality of pseudo-random signals indicating the first pseudo-random number through a first plurality of mesh wires to a mesh buffer;
    converting the first plurality of pseudo-random signals into a first plurality of input signals;
    comparing the first plurality of input signals with a second plurality of input signals indicating the second pseudo-random number to generate an output signal from the electronic mesh block;
    generating a clock tamper detect signal in a clock tamper detector;
    setting the clock tamper detect signal to a logic value at a first time; and
    setting the clock tamper detect signal to a result of an OR operation at a second time subsequent to the first time,
    wherein the output signal indicates an occurrence of an unauthorized activity on the electronic mesh block, and
    wherein converting the first plurality of pseudo-random signals into the first plurality of input signals comprises rearranging and inverting the first plurality of pseudo-random signals to generate a plurality of modified signals using the mesh buffer.

2. The method of claim 1, wherein the first and second pseudo-random numbers are generated using first and second linear-feedback shift registers (LFSRs), respectively.

3. The method of claim 1, further comprising transmitting the plurality of modified signals to an inverting block through a second plurality of mesh wires.

4. The method of claim 1, wherein converting the first plurality of pseudo-random signals into the first plurality of input signals further comprises:
    inverting the plurality of modified signals to generate the first plurality of input signals, and
    wherein the first plurality of input signals have logic values corresponding to those of the first plurality of pseudo-random signals, respectively.

5. The method of claim 4, wherein comparing the first plurality of input signals with the second plurality of input signals comprises comparing the first plurality of input signals with the second plurality of input signals in parallel.

6. The method of claim 3, further comprising:
    outputting first one of the plurality of modified signals from the mesh buffer via first one of the second plurality of mesh wires extending from the mesh buffer; and
    outputting second one of the plurality of modified signals from the mesh buffer via second one of the second plurality of mesh wires.

7. The method of claim 1, wherein the electronic mesh block is a first electronic mesh block and the output signal is a first output signal, the method further comprising:
    generating third and fourth pseudo-random numbers using third and fourth PRNGs in a second electronic mesh block, respectively;
    comparing a third plurality of input signals with a fourth plurality of input signals indicating the fourth pseudo-random number to generate a second output signal from the second electronic mesh block, wherein the second output signal indicates an occurrence of an unauthorized activity on the second electronic mesh block; and
    performing the OR operation on the first and second output signals in the clock tamper detector.

8. The method of claim 7, wherein the second time corresponds to a rising edge of a clock signal received by the clock tamper detector.

9. An apparatus comprising:
    an electronic mesh block;
    a first pseudo-random number generator (PRNG) configured to generate a first pseudo-random number;
    a second PRNG configured to generate a second pseudo-random number;
    a first plurality of mesh wires configured to transmit a first plurality of pseudo-random signals indicating the first pseudo-random number;
    a mesh buffer and an inverting block configured to convert the first plurality of pseudo-random signals into a first plurality of input signals;
    a comparator configured to compare the first plurality of input signals with a second plurality of input signals indicating the second pseudo-random number and generate an output signal from the electronic mesh block, the output signal indicating an occurrence of an unauthorized activity on the electronic mesh block; and
    a clock tamper detector to generate a clock tamper detect signal, to set the clock tamper detect signal to a logic value at a first time, and to set the clock tamper detect signal to a result of an OR operation at a second time subsequent to the first time,
    wherein the first PRNG, the second PRNG, and the comparator are provided in the electronic mesh block, and
    wherein the mesh buffer includes a plurality of inverters configured to rearrange and invert the first plurality of pseudo-random signals to generate a plurality of modified signals.

10. The apparatus of claim 9, wherein the first and second pseudo-random numbers are generated using first and second linear-feedback shift registers (LFSRs), respectively, and
    wherein the second PRNG is included in a comparator block, the comparator block further including the comparator and the inverting block.

11. The apparatus of claim 9, further comprising
    a second plurality of mesh wires configured to transmit the plurality of modified signals to the inverting block.

12. The apparatus of claim 11, wherein two neighboring wires among the first and second plurality of mesh wires are spaced 0.4 μm apart from each other.

13. The apparatus of claim 9, wherein the inverting block is configured to invert the plurality of modified signals to generate the first plurality of input signals, the first plurality of input signals having logic values corresponding to those of the first plurality of pseudo-random signals, respectively.

14. The apparatus of claim 13, wherein the comparator includes an iterative network having a plurality of cells, each cell receiving a first input signal among the first plurality of input signals and a second input signal among the second plurality of input signals, the first and second input signals indicating a pair of corresponding binary numbers.

15. The apparatus of claim 11, wherein the mesh buffer outputs first one of the plurality of modified signals via first one of the second plurality of mesh wires, and outputs second one of the plurality of modified signals via second one of the second plurality of mesh wires.

16. The apparatus of claim 9, wherein the electronic mesh block is a first electronic mesh block and the output signal is a first output signal, the apparatus further comprising:
a second electronic mesh block configured to generate a second output signal, the second output signal indicating whether an unauthorized activity on the second electronic mesh block is detected, and
wherein the clock tamper detector performs the OR operation on the first and second output signals.

17. The apparatus of claim 16, wherein the second time corresponds to a rising edge of a clock signal received by the clock tamper detector.

18. The apparatus of claim 9, wherein the first and second pseudo-random numbers are generated using first and second linear-feedback shift registers (LFSRs), respectively,
wherein the electronic mesh block includes:
a substrate;
a device layer disposed over the substrate and including a plurality of electronic devices;
a plurality of lower interconnection layers disposed over the device layer and including a plurality of wires interconnecting the plurality of electronic devices;
an upper interconnect layer disposed over the plurality of lower interconnection layers and including a plurality of wires, the plurality of wires configured to transmit the first plurality of pseudo-random signals indicating the first pseudo-random number; and
a cover layer disposed over the upper interconnect layer, and
wherein the plurality of lower interconnection layers includes:
a clock wire configured to provide a clock signal to the electronic mesh block;
an alarm wire configured to transmit the output signal to a controller; and
a plurality of comparator block wires disposed in a comparator block and configured to transmit the first plurality of input signals to the comparator.

19. The method of claim 1, wherein the first plurality of pseudo-random signals are rearranged such that at least two of a plurality of inverters in the mesh buffer receive different signals from corresponding ones of the first plurality of pseudo-random signals.

20. The apparatus of claim 9, wherein at least two of the plurality of inverters in the mesh buffer receive different signals from corresponding ones of the first plurality of pseudo-random signals to rearrange the first plurality of pseudo-random signals.

* * * * *